(12) United States Patent
Takeo

(10) Patent No.: US 9,556,924 B2
(45) Date of Patent: Jan. 31, 2017

(54) SHOCK ABSORBER

(71) Applicant: KAYABA INDUSTRY CO., LTD., Tokyo (JP)

(72) Inventor: Satoru Takeo, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/389,747

(22) PCT Filed: May 15, 2013

(86) PCT No.: PCT/JP2013/063586
§ 371 (c)(1),
(2) Date: Sep. 30, 2014

(87) PCT Pub. No.: WO2013/176023
PCT Pub. Date: Nov. 28, 2013

(65) Prior Publication Data
US 2015/0060220 A1    Mar. 5, 2015

(30) Foreign Application Priority Data

May 22, 2012  (JP) ................................. 2012-116198

(51) Int. Cl.
*F16F 9/38* (2006.01)
*F16F 9/19* (2006.01)

(52) U.S. Cl.
CPC . *F16F 9/38* (2013.01); *F16F 9/19* (2013.01); *F16F 2226/04* (2013.01)

(58) Field of Classification Search
CPC ....................................................... F16F 9/38

USPC ...................................................... 188/322.12
See application file for complete search history.

(56) References Cited

U.S. PATENT DOCUMENTS

| 3,830,347 | A | * | 8/1974 | Fader et al. | 188/322.12 |
| 3,907,080 | A | * | 9/1975 | Chadwick | 188/322.12 |
| 4,167,991 | A | * | 9/1979 | Karklins et al. | 188/322.12 |
| 4,199,855 | A | * | 4/1980 | McClellan | 29/450 |
| 2015/0354657 | A1 | * | 12/2015 | Takeo | F16F 9/38 188/322.12 |

FOREIGN PATENT DOCUMENTS

| DE | 1034928 | B | * | 7/1958 | ............... F16F 9/38 |
| DE | 3735058 | A | * | 4/1989 | |
| DE | 1374738 | A2 | * | 1/2004 | ............... A47C 3/30 |
| FR | 1470539 | A | * | 2/1967 | |
| GB | 833027 | A | * | 4/1960 | ............... F16F 9/38 |
| JP | 54-124887 | U | | 8/1979 | |
| JP | S59-110707 | U | | 7/1984 | |
| JP | 61154341 | U | * | 9/1986 | |

(Continued)

*Primary Examiner* — Thomas J Williams
(74) *Attorney, Agent, or Firm* — Rabin & Berdo, P.C.

(57) ABSTRACT

A shock absorber includes a damper main body that has a tubular outer shell and a piston rod that advances and retreats freely into and from the outer shell, and that is configured to generate a damping force for suppressing relative movement in an axial direction between the piston rod and the outer shell. The shock absorber includes a tubular dust cover that is connected to the piston rod and is configured to allow the outer shell to advance into an interior thereof and a tubular extension cover that is attached to an outer shell side end of the dust cover in a condition where the outer shell is inserted therein.

10 Claims, 1 Drawing Sheet

(56) References Cited

FOREIGN PATENT DOCUMENTS

| JP | 2000-081071 A | | 3/2000 |
|----|---------------|---|--------|
| JP | 2000088031 A | * | 3/2000 |
| JP | 2000-213584 A | | 8/2000 |
| JP | 2000211506 A | * | 8/2000 |
| JP | 2009236272 A | * | 10/2009 |
| JP | 2010-175043 A | | 8/2010 |
| RU | 2173419 C2 | * | 9/2001 |

* cited by examiner

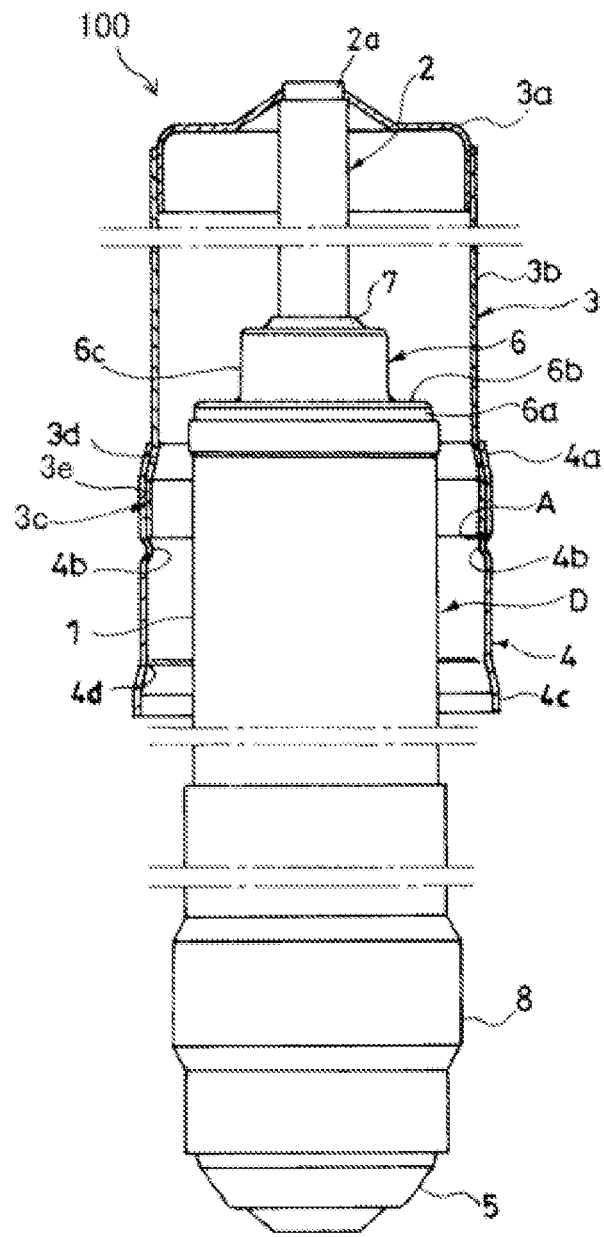

SHOCK ABSORBER

TECHNICAL FIELD

The present invention relates to a shock absorber.

BACKGROUND ART

JP2000-81071A and JP2010-175043A disclose a shock absorber having an outer shell and a piston rod inserted into the outer shell to be free to advance and retreat. The shock absorber is configured such that when the piston rod moves in an axial direction relative to the outer shell, a damping force is generated to suppress the relative movement between the piston rod and the outer shell. The shock absorber is disposed in a vehicle between a vehicle body and an axle or between a cabin and the vehicle body, for example, in order to suppress vibration of a damping subject such as the vehicle body or the cabin using the damping force.

The shock absorber is exposed to the outside during use, and therefore dust, dirt, and so on are likely to adhere to the piston rod of the shock absorber. When the piston rod advances into the outer shell, the dirt and so on adhered to an outer periphery of the piston rod are scraped away by a dust seal that seals the outer periphery of the piston rod. When dirt and so on dry out so as to adhere firmly to the piston rod, the dirt and so on adhered to the piston rod cannot be scraped away by the dust seal, and may cause an oil seal provided inside the dust seal to deteriorate. Therefore, the shock absorber is provided with a dust cover that covers the outer periphery of the piston rod so that the piston rod is protected from dirt and so on by the dust cover.

SUMMARY OF INVENTION

In a shock absorber having a dust cover, an effect of preventing dirt and so on from adhering to the piston rod increases as an axial direction length of the dust cover increases. However, when the length of the dust cover is increased, the dust cover covers an upper end part of the outer shell. Hence, when an outer surface of the outer shell is spray painted after attaching the dust cover to the outer shell, an unpainted part may be left at the upper end of the outer shell. Leaving a part of the outer shell unpainted in this manner is undesirable in terms of preventing the outer shell from rusting.

In the shock absorber disclosed in JP2000-81071A, an overall length of the dust cover is set such that when the shock absorber is in a maximum expansion condition, the dust cover barely covers the upper end of the outer shell. According to this shock absorber, an unpainted part on the outer shell can be avoided. However, dirt and so on can easily infiltrate the dust cover through a gap between the upper end of the outer shell and a lower end of the dust cover. As a result, the effect of the dust cover for preventing dirt and so on from adhering to the piston rod deteriorates.

In the shock absorber disclosed in JP2010-175043A, the overall length of the dust cover is set so that infiltration of dirt and so on can be suppressed sufficiently. However, the outer shell is spray painted before the dust cover is attached to the outer shell. When the dust cover is not attached to the outer shell, spray painting must be performed after pushing the piston rod into the outer shell so that the shock absorber is held in a maximum contraction condition and setting the shock absorber in a painting mechanism in this condition to ensure that an outer peripheral sliding surface of the piston rod is not sprayed with paint. As a result, the painting process becomes laborious and complicated.

An object of the present invention is to provide a shock absorber in which an outer periphery of a piston rod can be protected sufficiently, and a painting process can be performed without difficulty.

According to an aspect of the present invention, a shock absorber includes a damper main body that has a tubular outer shell and a piston rod that advances and retreats freely into and from the outer shell, and that is configured to generate a damping force for suppressing relative movement in an axial direction between the piston rod and the outer shell. The shock absorber includes a tubular dust cover that is connected to the piston rod and is configured to allow the outer shell to advance into an interior thereof and a tubular extension cover that is attached to an outer shell side end of the dust cover in a condition where the outer shell is inserted therein.

Embodiments and advantages of the present invention will be described in detail below with reference to the attached figures.

BRIEF DESCRIPTION OF DRAWINGS

FIG. 1 is a side view of a shock absorber according to an embodiment of the present invention.

DESCRIPTION OF EMBODIMENTS

As shown in FIG. 1, a shock absorber 100 according to this embodiment includes a damper main body D having a tubular outer shell 1 and a piston rod 2 that is free to advance into and retreat from the outer shell 1, a tubular dust cover 3 that is connected to the piston rod 2 and allows the outer shell 1 to advance into an interior thereof, and a tubular extension cover 4 provided on an outer shell side end A of the dust cover 3 in a condition where the outer shell 1 is inserted therein. The damper main body D of the shock absorber 100 is configured to generate a damping force for suppressing relative movement in an axial direction between the piston rod 2 and the outer shell 1.

Although not shown in FIG. 1, the damper main body D includes an inner tube housed in the outer shell 1, a piston that is inserted into the inner tube to be free to slide, and that divides the interior of the inner tube into an expansion side chamber and a contraction side chamber, the piston rod 2, which is inserted into the inner tube to be free to move and connected to the piston at one end, and a passage connecting the expansion side chamber to the contraction side chamber. The expansion side chamber and the contraction side chamber of the inner tube are filled with a liquid such as working oil. The liquid charged into the inner tube may be water, an aqueous solution, or the like rather than working oil.

When an external force acts on the shock absorber 100 such that the piston rod 2 moves relative to the outer shell 1 in the axial direction, or in other words when the damper main body D is caused to expand and contract by the external force, the piston moves through the inner tube in the axial direction together with the piston rod 2. As a result, either the expansion side chamber or the contraction side chamber in the inner tube contracts such that a differential pressure is generated between a pressure in the expansion side chamber and a pressure in the contraction side chamber. In the damper main body D, this differential pressure acts on the piston, thereby generating a damping force for suppressing the relative movement in the axial direction between the outer shell 1 and the piston rod 2.

The shock absorber 100 is constituted by a single rod type shock absorber in which the piston rod 2 is inserted only into the expansion side chamber of the inner tube. Accordingly, a reservoir is formed between an inner peripheral surface of the outer shell 1 and an outer peripheral surface of the inner tube as an annular gap filled with a gas and working oil (liquid). The shock absorber 100 is a single rod type multi-tube shock absorber configured such that working oil corresponding to a volume of the piston rod 2 advancing into and retreating from the outer shell 1 is compensated for between the reservoir and the inner tube.

It should be noted that the shock absorber 100 may be a single tube shock absorber not provided with the inner tube, instead of a multi-tube shock absorber. In this case, the expansion side chamber and the contraction side chamber are defined within the outer shell 1, and the piston is disposed so as to slide relative to the outer shell 1. In this type of single tube shock absorber, the volume of the piston rod 2 advancing into and retreating from the outer shell 1 is compensated for by inserting a free piston into the outer shell 1 to be free to slide so that a gas chamber is formed. Alternatively, a gas chamber may be formed in the outer shell 1 using an elastic partition wall such as a bladder. Furthermore, the shock absorber 100 may be configured as a double rod type shock absorber in which the piston is disposed in an axial direction central position of the piston rod 2 or the like, instead of a single rod type.

Next, referring to FIG. 1, respective constituent members of the shock absorber 100 will be described.

The outer shell 1 is a cylindrical member. A lower end of the outer shell 1 is closed by a cap 5. A tubular seal case 6 is attached to an upper end of the outer shell 1. The seal case 6 includes a cylindrical large diameter portion 6a attached to an inner peripheral surface of the upper end portion of the outer shell 1, a flange portion 6b formed as a donut-shaped flat plate that extends inwardly from an upper end of the large diameter portion 6a, and a cylindrical small diameter portion 6c that stands upright from an inner peripheral edge of the flange portion 6b. A seal member 7 is housed in an interior of the small diameter portion 6c.

The seal member 7 includes a seal portion that slides against an outer peripheral surface of the piston rod 2 to prevent the working oil from leaking out of the outer shell 1, and a dust seal portion that slides against the outer peripheral surface of the piston rod 2 in order to scrape away dirt and the like adhered to the piston rod 2.

The piston rod 2 is a rod-shaped member. The dust cover 3 is attached to an upper end 2a of the piston rod 2. The dust cover 3 includes a closed end cylinder-shaped connecting portion 3a, the upper end 2a of the piston rod 2 being fixed to a central portion of a bottom surface thereof, and a cylindrical cover main body 3b that extends downward from an outer peripheral side face of the connecting portion 3a.

An inner diameter of the cover main body 3b is set to be larger than an outer diameter of the outer shell 1. By setting the diameter in this manner, the outer shell 1 can advance into the cover main body 3b, and the dust cover 3 does not obstruct expansion and contraction of the damper main body D.

A lower end of the cover main body 3b, or in other words the outer shell side end A of the dust cover 3, is formed as an enlarged diameter portion 3c having larger inner and outer diameters than other parts. The extension cover 4 is connected to an outer peripheral surface of the enlarged diameter portion 3c.

The enlarged diameter portion 3c includes a tapered portion 3d constituting an upper end (a piston rod side end portion) of the enlarged diameter portion 3c, and a cylindrical portion 3e constituting a lower end (an outer shell side end portion) of the enlarged diameter portion 3c. The tapered portion 3d is formed in a tapered shape by gradually increasing the diameter of the cover main body 3b to a maximum diameter of the enlarged diameter portion 3c. The cylindrical portion 3e is connected to a lower side of the tapered portion 3d, and a diameter of the cylindrical portion 3e is set at the maximum diameter of the enlarged diameter portion 3c.

The extension cover 4 is a cylindrical member formed from an elastic synthetic resin. The extension cover 4 is formed in a shape that does not interfere with the outer shell 1, thereby allowing the outer shell 1 to advance into the interior of the extension cover 4.

The extension cover 4 includes a tapered first latch portion 4a formed by bending a cover upper end (a piston rod side end portion) so as to incline inwardly, a plurality of second latch portions 4b positioned below the first latch portion 4a so as to project inwardly from a cover inner peripheral surface, and an enlarged diameter end portion 4c formed by bending a cover lower end (an outer shell side end portion) so as to increase in diameter. The second latch portions 4b are formed as latch projections that project from the cover inner peripheral surface, and the plurality of second latch portions 4b are disposed at predetermined intervals around an identical circumference of the cover inner peripheral surface. It should be noted that one or more second latch portions 4b may be provided as the latch projections.

The lower end of the extension cover 4 is formed as the enlarged diameter end portion 4c, and therefore, when the damper main body D is in the maximum contraction condition, interference between the extension cover 4 and a protector 8 attached to the lower end of the outer shell 1 can be avoided. Further, the extension cover 4 is unlikely to interfere with the outer shell 1 even when the extension cover 4 tilts relative to the dust cover 3. An upper portion inner peripheral surface of the enlarged diameter end portion 4c is formed as a curved surface 4d that curves in an arc shape. Hence, even if the extension cover 4 tilts so as to interfere with the outer peripheral surface of the outer shell 1, the curved surface 4d of the enlarged diameter end portion 4c contacts the outer shell 1, and therefore the outer peripheral surface of the outer shell 1 is not damaged.

The extension cover 4 is made of synthetic resin, but may be made of metal or rubber. Comparing a metal extension cover with the synthetic resin extension cover 4, the synthetic resin extension cover 4 is advantaged in that there is no danger of rust even when the extension cover 4 is not painted, and painted surfaces of the outer shell 1 and so on are unlikely to be damaged when the extension cover 4 is attached to the dust cover 3. Further, comparing a rubber extension cover with the synthetic resin extension cover 4, the synthetic resin extension cover 4 is advantaged in being less likely to deteriorate, leading to an increase in lifespan.

Next, a method of assembling the shock absorber 100, or in other words a method of attaching the dust cover 3 and the extension cover 4, will be described.

First, the connecting portion 3a of the dust cover 3 is connected to the upper end 2a of the piston rod 2 of the damper main body D.

After the process for connecting the dust cover 3, outer surfaces of the dust cover 3 and the outer shell 1 are painted. The dust cover 3 is configured such that when the damper main body D is in the maximum expansion condition, the lower end of the dust cover 3 is positioned slightly below the upper end of the outer shell 1. For example, when the damper main body D is in the maximum expansion condition, the lower end of the dust cover 3 faces the seal case 6. Hence, even when spray painting is performed such that the paint is sprayed, the outer surface of the outer shell 1 can be painted sufficiently while preventing the paint from adhering to the outer peripheral surface of the piston rod 2.

When the painting process is complete, the extension cover 4 is attached from the upper end side of the dust cover 3. In the process for attaching the extension cover 4, the piston rod side end of the dust cover 3 is inserted into the extension cover 4 from the lower end side of the extension cover 4.

As the dust cover 3 advances into the extension cover 4, the second latch portions 4b of the extension cover 4 contact the tapered portion 3d of the enlarged diameter portion 3c of the dust cover 3. As the dust cover 3 advances further into the extension cover 4, the second latch portions 4b slide over the tapered portion 3d such that an upper end part of the extension cover 4 gradually increases in diameter. The enlarged diameter portion 3c of the dust cover 3 includes the tapered portion 3d that guides the second latch portions 4b of the extension cover 4, and therefore, during attachment of the extension cover 4, smooth relative movement can be realized between the extension cover 4 and the dust cover 3.

As the dust cover 3 advances even further into the extension cover 4, the inner peripheral surface of the first latch portion 4a of the extension cover 4 contacts and catches on the outer peripheral surface of the tapered portion 3d serving as the piston rod side end of the enlarged diameter portion 3c. At this time, the second latch portions 4b of the extension cover 4 have passed over the cylindrical portion 3e of the enlarged diameter portion 3c, and therefore the diameter of the upper end part of the extension cover 4 has returned to its original diameter. By positioning the second latch portions 4b to contact a lower end surface of the cylindrical portion 3e from the lower side in this manner, the second latch portions 4b catch on the outer shell side end of the enlarged diameter portion 3c, and as a result, upward movement of the extension cover 4 relative to the dust cover 3 is restricted.

By disposing the enlarged diameter portion 3c of the dust cover 3 on the inner side of the extension cover 4 between the first latch portion 4a and the second latch portions 4b, as described above, the extension cover 4 is locked fixedly to the dust cover 3. In the shock absorber 100, the extension cover 4 is fixed so as to be prevented from falling off the dust cover 3, but no separate fixing components are required.

It should be noted that the method of fixing the extension cover 4 to the dust cover 3 is not limited to the embodiment described above. For example, the upper end of the extension cover 4 and the lower end of the dust cover 3 may be fixed using an adhesive or using a bolt and a nut.

In the shock absorber 100, the enlarged diameter portion 3c of the dust cover 3 includes the tapered portion 3d, and therefore, when the extension cover 4 is attached to the outer peripheral surface of the dust cover 3, the diameter of the extension cover 4 can be increased gradually by the tapered portion 3d, thereby facilitating the attachment operation.

Further, the second latch portions 4b of the extension cover 4 may be formed as an annular projection provided around the entire circumference of the inner peripheral surface of the extension cover 4. However, by forming the second latch portions 4b from the plurality of latch projections described above rather than an annular projection, the diameter of the extension cover 4 can be increased more easily during attachment, thereby facilitating the operation for attaching the extension cover 4 to the dust cover 3.

The first latch portion 4a is formed in a tapered shape so as to cover and contact the tapered portion 3d, and in a condition where the extension cover 4 is attached to the dust cover 3, the inner peripheral surface of the first latch portion 4a closely contacts the outer peripheral surface of the tapered portion 3d. Hence, a gap is not formed between the first latch portion 4a and the tapered portion 3d, and therefore dirt and so on can be prevented from infiltrating the dust cover 3 between the extension cover 4 and the dust cover 3. As long as a gap is not formed between the first latch portion 4a of the extension cover 4 and the enlarged diameter portion 3c of the dust cover 3, the first latch portion 4a may be modified appropriately in accordance with the shape of the piston rod side end of the enlarged diameter portion 3c.

In the shock absorber 100, the lower end of the extension cover 4 is positioned below the outer shell side end A of the dust cover 3, and therefore, by covering the outer shell 1 with both the dust cover 3 and the extension cover 4, a larger part of the outer shell 1 can be covered than when the outer shell 1 is covered by the dust cover 3 alone. By covering a larger part of the outer shell 1 using the extension cover 4 in this manner, an infiltration path for dirt and the like extending from the lower end of the extension cover 4 to the piston rod 2 can be increased in length in comparison with a conventional shock absorber. Accordingly, dirt or the like is less likely to infiltrate the dust cover 3 between the outer shell 1 and the extension cover 4, and therefore adhesion of dirt and so on to the piston rod 2 can be suppressed.

In the shock absorber 100, spray painting is performed before attaching the extension cover 4, and therefore no unpainted parts are left on the outer surface of the outer shell 1. As a result, rusting of the outer shell 1 can be prevented. By painting the dust cover 3 and the outer shell 1 before attaching the extension cover 4 in this manner, there is no need to hold the damper main body D in the maximum contraction condition or mask the outer periphery of the piston rod 2 before attaching the dust cover 3, as in the related art. Hence, the process for painting the outer shell 1 can be performed more easily.

With the shock absorber 100 according to this embodiment, as described above, the outer periphery of the piston rod 2 can be protected sufficiently, and the painting process can be performed without difficulty.

In the shock absorber 100, the enlarged diameter portion 3c of the dust cover 3 is sandwiched between the first latch portion 4a and the second latch portions 4b of the extension cover 4 so that the extension cover 4 is locked fixedly to the dust cover 3. When the extension cover 4 is attached, the inner peripheral surface of the tubular first latch portion 4a closely contacts the outer peripheral surface of the enlarged diameter portion 3c of the dust cover 3, and therefore no gaps form between the first latch portion 4a and the enlarged diameter portion 3c. Hence, dirt and the like can be prevented from infiltrating the dust cover 3 between the extension cover 4 and the dust cover 3. As a result, the outer peripheral surface of the piston rod 2 can be protected reliably.

In the shock absorber 100, the piston rod side end of the dust cover 3 is inserted into the extension cover 4 from the lower end side of the extension cover 4 such that the lower end outer peripheral surface of the dust cover 3 and the upper end inner peripheral surface of the extension cover 4 are connected. As a result, the extension cover 4 can be prevented from falling downward from the outer shell side end A of the dust cover 3.

An embodiment of the present invention was described above, but the above embodiment is merely one example of an application of the present invention, and the technical scope of the present invention is not limited to the specific configurations of the above embodiment.

The present application claims priority based on Japanese Patent Application No. 2012-116198, filed with the Japan Patent Office on May 22, 2012, the entire contents of which are incorporated into this specification by reference.

The invention claimed is:

1. A shock absorber comprising:
a damper main body that includes a tubular outer shell and a piston rod that freely advances into the outer shell and freely retreats from the outer shell towards a maximum expansion condition of the damper main body, and that is configured to generate a damping force for suppressing relative movement in an axial direction between the piston rod and the outer shell;
a tubular dust cover that is connected to the piston rod and is configured to allow the outer shell to advance into an interior thereof; and
a tubular extension cover that is attached to an outer shell side end of the dust cover in a condition where the outer shell is inserted therein,
wherein when the damper main body is in the maximum expansion condition, a lower end of the dust cover is positioned slightly below an upper end of the outer shell,
wherein the dust cover includes an enlarged diameter portion on the outer shell side end thereof,
wherein the extension cover is composed of one member and includes
a first latch portion formed on a cover inner peripheral surface so as to catch on a piston rod side end portion of the enlarged diameter portion, and
a second latch portion formed on the cover inner peripheral surface so as to catch on an outer shell side end portion of the enlarged diameter portion,
wherein the extension cover is fixed to the dust cover by disposing the enlarged diameter portion between the first latch portion and the second latch portion in the extension cover, and
wherein the second latch portion is constituted by a plurality of latch projections formed on an identical circumference on the cover inner peripheral surface of the extension cover.

2. The shock absorber as defined in claim 1, wherein an outer surface of the outer shell is painted, and
the extension cover is attached to an outer periphery of the dust cover connected to the painted outer shell.

3. The shock absorber as defined in claim 1, wherein the extension cover is configured such that a piston rod side end of the dust cover is inserted therein from an outer shell side end of the extension cover, and the extension cover is attached to the dust cover by connecting an inner peripheral surface of a piston rod side end of the extension cover to an outer peripheral surface of the outer shell side end of the dust cover.

4. The shock absorber as defined in claim 1, wherein the extension cover is made of resin.

5. The shock absorber as defined in claim 1, wherein an outer surface of the outer shell is painted, and
the extension cover is attached to an outer periphery of the dust cover so that the extension cover covers the painted outer surface of the outer shell.

6. The shock absorber as defined in claim 1, wherein the lower end of the dust cover is the outer shell side end of the dust cover.

7. A shock absorber comprising:
a damper main body that includes a tubular outer shell and a piston rod that freely advances into the outer shell and freely retreats from the outer shell towards a maximum expansion condition of the damper main body, and that is configured to generate a damping force for suppressing relative movement in an axial direction between the piston rod and the outer shell;
a tubular dust cover that is connected to the piston rod and is configured to allow the outer shell to advance into an interior thereof; and
a tubular extension cover that is attached to an outer shell side end of the dust cover in a condition where the outer shell is inserted therein,
wherein when the damper main body is in the maximum expansion condition, a lower end of the dust cover is positioned slightly below an upper end of the outer shell, and
wherein the extension cover is composed of one member and directly attached to only the dust cover.

8. A shock absorber comprising:
a damper main body that includes a tubular outer shell and a piston rod that freely advances into the outer shell and freely retreats from the outer shell towards a maximum expansion condition of the damper main body, and that is configured to generate a damping force for suppressing relative movement in an axial direction between the piston rod and the outer shell;
a tubular dust cover that is connected to the piston rod and is configured to allow the outer shell to advance into an interior thereof; and
a tubular extension cover that is attached to an outer shell side end of the dust cover in a condition where the outer shell is inserted therein,
wherein when the damper main body is in the maximum expansion condition, a lower end of the dust cover is positioned slightly below an upper end of the outer shell, and
wherein the extension cover is directly attached to only the dust cover.

9. The shock absorber as defined in claim 8, wherein the extension cover is made of resin.

10. A shock absorber comprising:
a damper main body that includes a tubular outer shell and a piston rod that freely advances into the outer shell and freely retreats from the outer shell towards a maximum expansion condition of the damper main body, and that is configured to generate a damping force for suppressing relative movement in an axial direction between the piston rod and the outer shell;
a tubular dust cover that is connected to the piston rod and is configured to allow the outer shell to advance into an interior thereof; and
a tubular extension cover that is attached to an outer shell side end of the dust cover in a condition where the outer shell is inserted therein,
wherein when the damper main body is in the maximum expansion condition, a lower end of the dust cover is positioned slightly below an upper end of the outer shell, and
wherein the extension cover is made of resin,
wherein the extension cover is composed of one member, and wherein the extension cover is directly attached to only the dust cover.

* * * * *